United States Patent [19]
Gellert

[11] 3,806,295
[45] Apr. 23, 1974

[54] VALVE GATE PIN ACTUATING MECHANISM

[76] Inventor: Jobst Ulrich Gellert, 227 Viewmont Ave., Toronto, Ontario, Canada

[22] Filed: July 21, 1972

[21] Appl. No.: 273,696

Related U.S. Application Data

[63] Continuation-in-part of Ser. No. 086,679, Nov. 4, 1970, abandoned.

[52] U.S. Cl. ...... 425/245 R, 425/DIG. 229, 425/243
[51] Int. Cl. .............................................. B29f 1/05
[58] Field of Search .......... 425/245, 247, DIG. 229, 425/DIG. 225, DIG. 224, 146, 145, 159, 243

[56] References Cited
UNITED STATES PATENTS

| | | | |
|---|---|---|---|
| 2,773,284 | 12/1956 | Kelly | 425/DIG. 229 |
| 2,865,050 | 12/1958 | Strauss | 425/DIG. 229 |
| 3,371,384 | 3/1968 | Nouel | 425/DIG. 225 |
| 3,491,408 | 1/1970 | Natkins | 425/244 |
| 3,037,245 | 6/1962 | Darnell | 425/245 |
| 2,770,011 | 11/1956 | Kelly | 425/DIG. 229 |
| 3,553,788 | 1/1971 | Putkowski | 425/243 X |
| 3,591,897 | 7/1971 | Perras | 425/243 X |

*Primary Examiner*—J. Spencer Overholser
*Assistant Examiner*—David S. Safran

[57] ABSTRACT

An injection molding machine for injecting pressurized fluidized plastic material into a mold cavity. The machine has an injection nozzle, a stationary platen and a reciprocating platen movable into and out of locked engagement therewith, a pair of mold halves, one of which is mounted on the reciprocating platen and the other on the stationary platen, said mold halves, when locked together, having a multiple of mold cavities for molding a plurality of molded articles. The stationary platen has a centrally positioned hot runner passage which communicates at one end with the nozzle and at the other end with branch lines leading to an inlet for each cavity in the stationary platen. Each branch line includes a channel section having a cylindrical bore, a valve gate pin mounted in each bore for closing each inlet, each pin having a piston-like section and a constricted section extending through the channel section and having one end terminating in a valve member which seats in said inlet, each pin being responsive to pressurized molding material in said channel to unseat the valve member during injection. A rocker arm chamber is formed in the stationary platen concentric with the hot runner passage with the other end of each valve gate pin extending thereinto. Rocker arms are mounted in the chamber for actuating the valve gate pins. The rocker arms have one end engageable with the said extending end. A piston, which is engageable with the other end of the rocker arm, is mounted in each cylinder formed in the stationary platen concentric with the hot runner system. A means is provided for introducing pressurized fluid, for example, air, simultaneously into each cylinder to apply uniform pressure to each piston and actuate the rocker arm to reseat said valve member at the end of an injection stroke. Valve means is provided for regulating the pressure, while the machine is in operation, to suit the type and make of the molding material.

2 Claims, 4 Drawing Figures

VALVE GATE PIN ACTUATING MECHANISM

This application is a continuation-in-part of my application Ser. No. 086,679 filed Nov. 4, 1970, now abandoned.

BACKGROUND OF THE INVENTION

The present invention relates to the construction of mold assemblies, and in particular, to valve gating for injection molding in which a single-stage opening is employed. By the term single-state, I mean a machine operation in which in accordance with the time programme of the machine, when the platens separate at the end of the molding step, they do so without interruption until they are fully opened and the molded article ejected.

My U.S. Pat. No. 3,488,810 was directed to the valve-gating opening using a molding cycle having an interrupted (two stage) opening stroke of the movable platen of the molding machine.

In the valve-gating cycle described in my U.S. Pat. No. 3,488,810, the actual mold closed-time at the parting line of the mold is divided into two stages. The two stage operation is obtained by mounting the movable mold half on a spring biased collar allowing limited movement therebetween. In the first stage, initial movement of the collar during closing of the platens, the collar actuates a lever operatively associated with the gate valve whereby the gate valve is moved to its open position and allows plastic material to flow into the mold cavity. At the end of the injection cycle, the opening of the platens is done in two stages. In the first stage, the movable platen of the machine moves a limited predetermined amount of its opening stroke, permitting the spring biased collar assembly to move away from the mold half sufficient to create the space required to allow the lever to be actuated to close the valve-gate. In this position, the cavity forming portions of the mold remain closed until the molded article is cooled down enough for ejection. Only then does the platen complete its opening stroke. The valve opening and closing mechanism described in my patent had the disadvantage of employing a two stage opening of the platens and molds which was complex, expensive to manufacture and the disadvantages inherent in the prior art, some of which are hereinafter stated.

PRIOR ART

Kelly U.S. Pat. No. 2,733,284 discloses a valve gate pin system in which the pin is actuated, to open and close the gate, by a lever arrangement connected to a piston which is responsive to a working fluid. The valve operating mechanism (piston, cylinder, working fluid and lever) are not related to the operating temperature of the manifold. This creates a problem since, if the machine is put into operation when the molding material is still solidified or the material solidifies while the machine is in operation, serious mechanical breakages will result. The same is true of applicants' prior U.S. Pat. No. 3,488,810.

In addition to the mechanism illustrated in the said prior patents for actuating the gate valve pins to open and close the entrance to the mold cavity in response to the well-known timing cycles used in the injection molding art, which timing cycles require no description herein, an hydraulic means is described in a book entitled Runnerless Molding, by Ernest P. Moslo, Reinhold Publishing Corporation, pages 136 to 139. The gate valve pin shows a lever having one end operatively connected to the pin and the other end operatively connected to a piston which is mounted in an actuating cylinder. Hydraulic fluid is used to actuate the piston in both directions. The described mechanism has the same disadvantage as the Kelly Patent.

U.S. Pat. Nos. 3,491,408 dated Jan. 27, 1970 (filed Oct. 13, 1967) to Natkins; 3,023,458 dated Mar. 6, 1962 (filed May 27, 1954 to Seymour; Canadian Patent 743,854 dated Oct. 4, 1966 (filed Mar. 5, 1962) to Seymour and French Patent 1,300,440 dated May 13, 1963 (filed Aug. 1, 1962) each illustrate an embodiment in which the pressure fluid is replaced by compression springs for closing each valve gate pin, the opening of the gates being effected by the pressure of the molding material.

In injection molding, the closing and opening of the valve gate pins must be precisely adjusted to the type and make of molding material, e.g. viscosity, and this adjustment can be best done with the machine in operation. Natkins recognized that precise adjustment is essential but does not teach how a precise and balanced adjustment is achieved; nor does he teach how the adjustment can be achieved with the machine in operation.

Also, in Natkin, Seymour and other similar structures wherein springs are used to close the valve gate pins, those valves which are opened by the pressure of the molding material, have to open against the added pressure of the spring pressure which is sometimes substantially greater than the injection pressure. Furthermore, the spring pressure has to be adjusted for each type of molding material and none of these structures show a means of effecting such adjustment short of a partial dismantling of the mold. This is a definite disadvantage.

OUTLINE OF INVENTION

Applicant's invention is constructed and operated to remove the foregoing and other disadvantages of the prior art structures. Briefly, some of the principle advantages of applicant's injection molding machine are as follows:

a. the safety factor which resides in the structure whereby all valves and valve operating mechanism are housed and integrated within the mold structure and with the proper molding temperature; applicant's machine will not operate until the operating mechanism has reached the molding temperature;

b. the valve gate pin is opened by the pressure of the molding without any back pressure and likewise is closed without having to work against any pressure;

c. the closing and opening of all valve gate pins in a multiple cavity mold can be precisely balanced;

d. the necessary adjustments to obtain the balanced condition can be made with the machine in operation; these necessary adjustments can be made quickly and with greater precision than has been hitherto done by the prior machines;

e. a much simpler construction of the machine is obtained.

With applicant's structure, a much superior molded product is obtained than has heretofore been obtainable with the prior machines such as those disclosed in the patents mentioned.

DESCRIPTION OF THE INVENTION

The conventional injection molding machine employs a valve gate pins controlling the injecting pressurized fluidized plastic material into a mold cavity comprises an injection nozzle, a substantially stationary platen and a reciprocating platen movable into and out of locked engagement therewith, a pair of mold halves, one of which is mounted on the reciprocating platen and the other on the stationary platen, said mold halves when locked together forming a plurality of mold cavities for molding the injected material into a molded article, the stationary platen having a hot runner passage communicating at one end with said nozzle when it is in engagement therewith and at the opposite end leading into a plurality of branch lines (one for each cavity), each of which communicates with an inlet leading into the respective mold cavity.

The injection molding machine of the present invention for injecting pressurized fluidized plastic material into a mold cavity includes an injection nozzle, a stationary platen and a reciprocatable platen movable into and out of locked engagement therewith, a pair of mold halves, one of which is mounted on the reciprocating platen and the other on the stationary platen, said mold halves, when locked together, having a multiple of mold cavities for molding a plurality of molded articles. The reciprocatable platen is timed to open, at the end of the molding cycle, without interruption from the closed or locked position to the fully open position; that is, in a single stage. The stationary platen has a centrally positioned hot runner passage which communicates at one end with the nozzle and at the other end with branch lines leading to an inlet for each cavity in the stationary platen. Each branch line includes a channel section generally perpendicular to and extending to the respective inlet, a cylindrical bore extending vertically into the stationary platen and in alignment and communicating with said section, a valve gate pin for closing each inlet, said pins being arranged adjacent the hot runner passage, each pin having a piston-like section mounted in said bore and a constricted section extending through the channel section and terminating in a valve member which downwardly seats in said inlet, each pin being responsive to pressurized plastic in said channel to unseat the valve member during injection. A rocker-arm chamber is formed in the stationary platen concentric with the hot runner passage with one end of each valve gate pin extending thereinto. A rocker arm, mounted in the chamber, is provided for each valve gate pin, each rocker-arm having one end engagable with the said extending end, a piston engagable with the other end of the rocker-arm, each piston being mounted in a separate cylinder formed in the stationary platen adjacent the hot runner system. A means is provided for introducing pressurized fluid, for example air, simultaneously into each cylinder to apply uniform pressure from a single source to each piston and actuate the rocker-arm to reseat said valve member at the end of an injection stroke. Valve means is provided for regulating the fluid pressure, while the machine is in operation, to suit the type and make of the molding material.

The present invention will be more fully understood by reference to the following description in conjunction with the appended drawings wherein.

Figure 1:
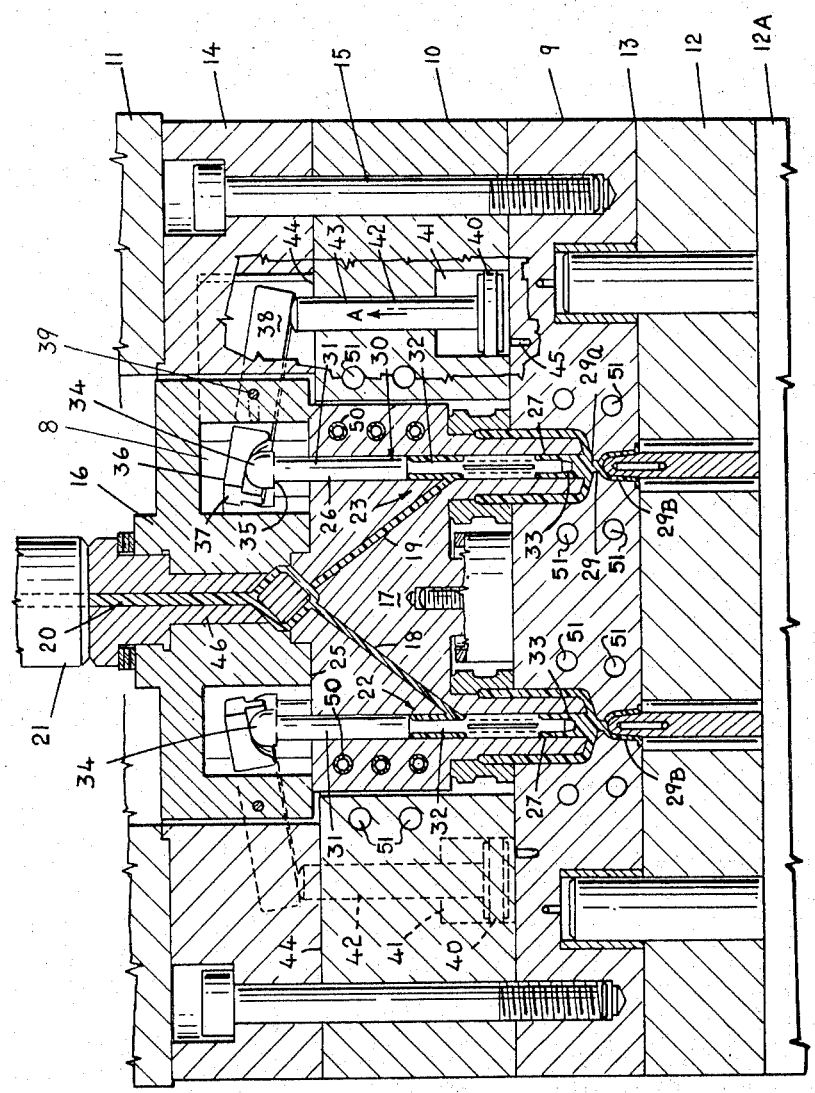
FIG. 1 is a partial cross-sectional view of the platens and mold assembly according to the present invention with the mold parts locked together in the injection cycle in which position the valve gate pins are shown in the open position.

The apparatus disclosed herein does not require to be described in detail as its construction and operation is fully disclosed in my said prior patent except as to such parts that relate to the present invention. For fuller details than is given herein, reference is to be had to the mentioned patent. It will therefore be sufficient to give only such details as may be necessary to explain the construction and operation of the present invention and its adaptation to an injection molding machine.

The mold assembly illustrated in the drawings consists of a pair of mold halves of the multi-cavity type generally indicated as the hot side mold half consisting of mold base 10 and cavity plate 9, formed with a plurality of conventional mold cavities, which is mounted on the stationary platen 11 (not shown in detail) and a conventional complementary mold-half 12 mounted on a reciprocating platen 12A (likewise not shown in detail). The parting line between the mold halves is indicated by the numeral 13. Interposed between the mold-base 10 and platen 11 is an annular collar 14 which is secured to the platen 11 by assembly bolts 15. The collar 14 forms part of the housing for the mechanism for actuating the valve gate pins to be described. The collar also surrounds the center piece 16 and includes a rocker-arm chamber 8 to be also described later.

The mold base 10 includes a hot runner manifold system 17 is heated by electric heating element 50 and is positioned centrally on the cavity plate 9. The mold base and the cavity plate 9 are each provided with cooling conduits 51. The hot runner manifold 17, which is surrounded by the mold base, has a plurality of feed channels, one for each cavity, only two of which are shown, namely 18, 19 each of which is connected at one end with a centrally located main channel 20 into which injection nozzle 21 injects hot melt to the runner as required and as programmed. Each of the feed channels forms part of the hot runner system and run diagonally from the main channel to its respective channel section, only two of which are shown, namely 22, 23. However, there is a channel section for each mold cavity, two of which are shown and identified by reference numers 24, 24A. Since the mold cavities are well-known to skilled mold and die-makers, there is no need to describe them in detail. Each channel section extends vertically through the cavity plate 9 and mold base 10 from the base of its respective mold cavity to back face 25 of the hot runner manifold system 17. Furthermore, each channel section is formed as a straight-through cylindrical bore, with a feed channel, e.g. feed channels 18 and 19 respectively, connected thereto about midway between the ends thereof. The portion of each channel section to the rear of said connection forms a cylinder 26 and front section 27 a continuation of each feed channel 18, 19, each front section having a valve seat 29 and passage 29a which leads to the mold cavity 29.

A valve gate pin generally indicated by the number 30 is mounted in each of the channel sections, each valve gate pin having a piston section 31 which is housed in the cylinder 26, and a constricted section 32 which is housed in the front section 27, the section 32 having a tapered end 33 which seats on valve seat 29. The section 31 projects beyond the back face 25 and is provided with a domed head 34 which is formed with shoulder 35. By referring to FIG. 2, it will be seen that the piston section 31 terminates to the rear of the point where the feed channel joins the front section 27. This is an important feature of the invention since the unseating of the valve gate pin on the injection stroke depends solely on the pressure. In other words, the piston 31 responds instantly to the pressure of the hot melt to move in the direction indicated by the arrow (FIG. 2) to unseat the tapered end 33 from valve seat 29. One important feature of the invention resides in the structure which mounts the valve gate pins within the manifold (hot runner system) whereby the pins are related to the temperature of the hot melt. Another important feature, as will be seen later, is that there is no back pressure resisting the unseating of the pins.

In the present construction each pair of valve gate pins are shown as being actuated from the open position (FIG. 1) to the closed position (FIG. 2) by a single means but it is to be understood that each pin can be actuated individually or in groups of more than two. The means for actuating each pair of valve gate pins in the illustrated construction comprises a rocker-arm 36 pivotally mounted in the chamber 8. The rocker-arm has, at one end, an actuating head 37 which is wide enough to engage head 34 of a pair of valve gate pins, a tail 38, the rocker-arm being mounted on pivot 39. The means for actuating each rocker-arm to seat the tapered ends 33 on the valve seats 29 in the time programme at the end of the injection hold time comprises a piston 40, for each rocker each of which is mounted in air chambers 41, only one of which is shown, formed in the base plate 10, each piston being provided with a piston rod 42 which is slidably housed in bore 43 that extends from each chamber 41 to the back face 44 of the base plate 10. The free end of each rod 42 engages with the respective tail 38. As each air chamber 41 is connected to a common source of pressurized fluid 45 all pistons 40 are subjected to the same closing pressure and thus close simultaneously. This pressure is released at the commencement of the injection cycle so that there is no back pressure restraining the opening of the valves. There is thus obtained a precise balance for all valves and instant response of the pins to move in the desired direction to open or closed position without any opposing force in the opposite direction.

Figure 2:
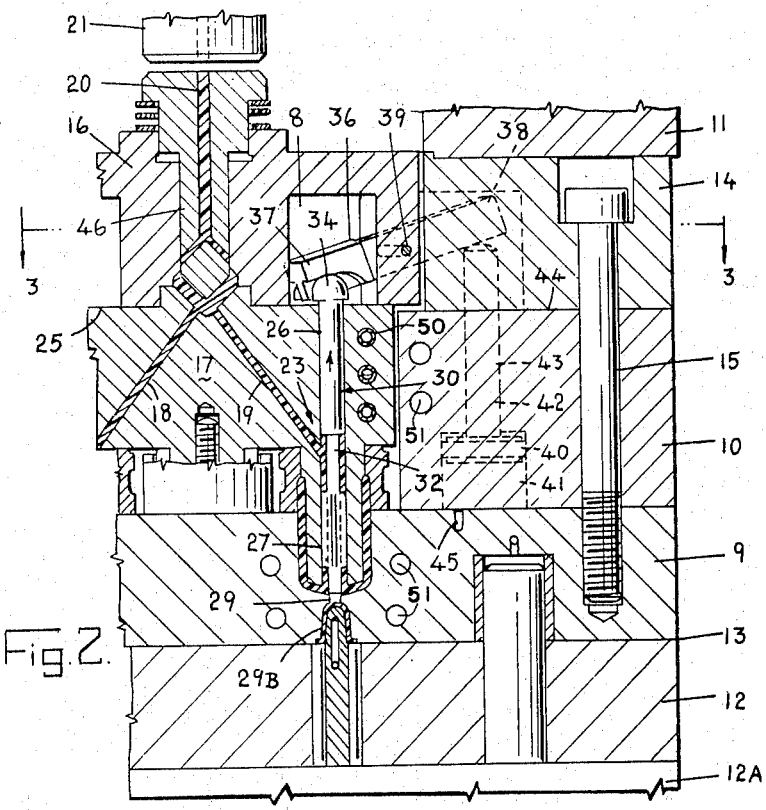
FIG. 2 is substantially the same as FIG. 1 but with the machine at the end of the injection cycle in which position the valve gate pins are in the closed position.
Figure 3:
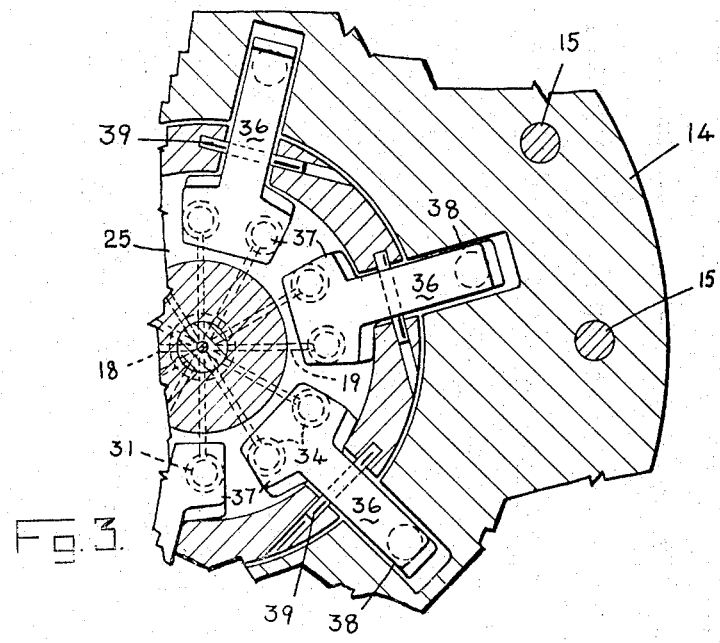
FIG. 3 is a cross-section on the line 3—3 of FIG. 2.
Figure 4:
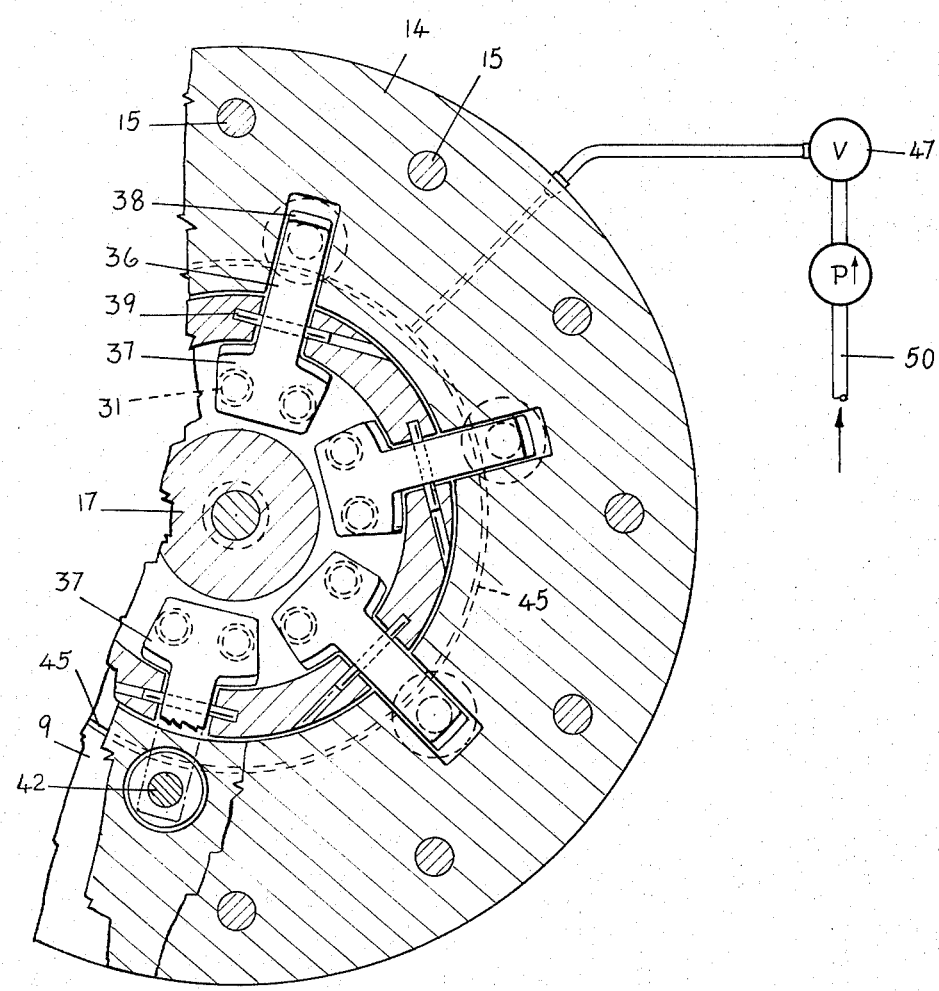
FIG. 4 is a view similar to FIG. 3 including a fluid pressure device.

The fluid pressure system also includes a regulating valve for regulating the pressure of the pressurized fluid (working fluid). This is important since it is necessary to vary the pressure to adjust the pressure to the type and make of the molding material and also have a balanced condition. Another important feature is that this adjustment can be accomplished with the machine in operation with the result that it can be done with precision and quickly to obtain the best possible results. Air pressure (working fluid) from a common source 50 is admitted into each chamber 41 through airway 45 according to the time cycle of the machine at the end of the injection hold time. An adjustable resulting valve 47 is provided for varying the pressure of the working fluid. As soon as the hold time has terminated, the pressure on the hot melt in the hot runner and the passages will be relieved. The timed cycle will simultaneously, with such termination, inject the working fluid into each chamber 41 which will actuate each piston in the direction of the arrow A in FIG. 1 which will result in the valve gate pin 30 moving to the closed position (FIG. 2). But also the nozzle 21 of the machine will automatically retract to allow the valve member 46, which is mounted in the center piece 16, to create volume in the hot runner system to allow for the volume the valve pins displace as described in my U.S. Pat. No. 3,530,539 and Canadian Patent No. 840,892 and which will now be briefly described.

The pin will retain the closed position to the end of the injection hold time. The air passage 45 is then automatically opened to exhaust. The pin remains in the closed position until the melt is again pressurized at the commencement of the injection stroke. It will thus be seen that, in this construction, the pin is free to move without restriction from open to closed position and vice versa.

As the opening and closing of all valves will be uniform and synchronous, a uniform product will be produced by each mold cavity at uniform time intervals.

What I claim is:

1. In an injection molding machine for injecting pressurized fluidized plastic material into a mold having a plurality of cavities, said machine having an injection nozzle, a substantially stationary platen and a reciprocating platen, a mold base mounted on the stationary platen, a pair of mold halves containing a plurality of cavities, one of the mold halves being mounted on the reciprocating platen and the other half on the mold base, said mold halves, when locked together during injection, form the mold cavities for molding the injected material into a molded article, means for single-stage reciprocating of said reciprocating platen relative to said stationary platen to move the mold halves between locked and open positions, said mold base comprising a collar having a centrally positioned nozzle and a rocker-arm chamber formed in the collar, a hot runner manifold mounted centrally on-to the cavity plate and surrounded by a cooled mold base, a hot runner passage in the manifold communicating at one end with said nozzle, said hot runner passage including a channel section for each cavity leading from the passage to one of the cavities, each channel section having a cylindrical chamber extending perpendicular relative to said cavity through said manifold and leading to an inlet in the respective cavity; a valve gate pin mounted in each cylindrical chamber and having its head extending into the rocker-arm chamber, each valve gate pin having a piston-like section mounted in said cylindrical chamber and a constricted section extending from said cylindrical chamber through the channel section and terminating in a valve member which seats in the inlet, each pin having surface means in its chamber facing its inlet for responding to pressurized fluid molding material in said channel to actuate each pin in a direction away from its inlet to unseat the valve member during injection, a rocker-arm for each valve gate pin pivotally mounted in the rocker-arm chamber, each rocker-arm having one end overlying and freely unattachedly engaging the top of its respective pin, a piston for actuating each rocker-arm in a direction to seat the pin on the inlet, each piston operating in a cylinder formed in the cooled mold base with all cylinders connected to a common source of pressurized working fluid, each piston extending into the rocker-arm chamber to engage with the other end of the rocker-arm and means introducing pressurized fluid from a common source into said cylinder when said mold halves are locked together for actuating said piston in a direction to engage and actuate the rocker-arm to reseat said valve member at the end of each injection stroke and to release said pressure at the end of the hold-time of the injection stroke.

2. The molding machine according to claim 1 including valve means for adjusting said fluid pressure during the operation of the machine.

* * * * *